US010172147B2

(12) United States Patent
Goria

(10) Patent No.: US 10,172,147 B2
(45) Date of Patent: Jan. 1, 2019

(54) METHOD AND SYSTEM FOR ALLOCATING RADIO RESOURCES FOR UPLINK TRANSMISSION IN CELLULAR NETWORKS

(71) Applicant: TELECOM ITALIA S.p.A., Milan (IT)

(72) Inventor: Paolo Goria, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 165 days.

(21) Appl. No.: 15/306,580

(22) PCT Filed: Apr. 30, 2014

(86) PCT No.: PCT/EP2014/058889
§ 371 (c)(1),
(2) Date: Oct. 25, 2016

(87) PCT Pub. No.: WO2015/165536
PCT Pub. Date: Nov. 5, 2015

(65) Prior Publication Data
US 2017/0048881 A1    Feb. 16, 2017

(51) Int. Cl.
*H04W 72/12* (2009.01)
*H04W 24/08* (2009.01)
*H04W 72/08* (2009.01)

(52) U.S. Cl.
CPC ....... *H04W 72/1226* (2013.01); *H04W 24/08* (2013.01); *H04W 72/1231* (2013.01); *H04W 72/1268* (2013.01); *H04W 72/085* (2013.01)

(58) Field of Classification Search
CPC ............. H04W 72/1226; H04W 72/04; H04W 72/0453; H04W 72/0493; H04W 72/12;
(Continued)

(56) References Cited

U.S. PATENT DOCUMENTS 7,778,217 B2    8/2010  Lee et al.
9,173,225 B2 *  10/2015 Liu ........................ H04W 72/10
(Continued)

FOREIGN PATENT DOCUMENTS

CN    102 647 796 A    8/2012
CN    102 917 455 A    2/2013
WO    2012/064240 A1    5/2012

OTHER PUBLICATIONS

International Search Report dated Jan. 29, 2015 in PCT/EP2014/058889 filed Apr. 30, 2014.

*Primary Examiner* — Faruk Hamza
*Assistant Examiner* — Aixa A Guadalupe Cruz
(74) *Attorney, Agent, or Firm* — Oblon, McClelland, Maier & Neustadt, L.L.P.

(57) ABSTRACT

A method is proposed for selecting an allocation group comprising an ordered succession of radio resources from a first radio resource to a last radio resource, iterating the following operations: selecting the last radio resource of the allocation group, each last radio resource taking, at each iteration, a position in the ordered succession lower than the position taken in the ordered succession by the last radio resource at the respective previous iteration, estimating a signal to interference-plus-noise ratio per radio resource of the allocation group according to a number of radio resources of the allocation group, from the first to the last radio resources of the allocation group, and according to history transmissions information, and until the signal to interference-plus-noise ratio per radio resource is higher than a predetermined signal to interference-plus-noise ratio, allocating the radio resources from said first to said last radio resources of the allocation group.

13 Claims, 4 Drawing Sheets

Figure 1:
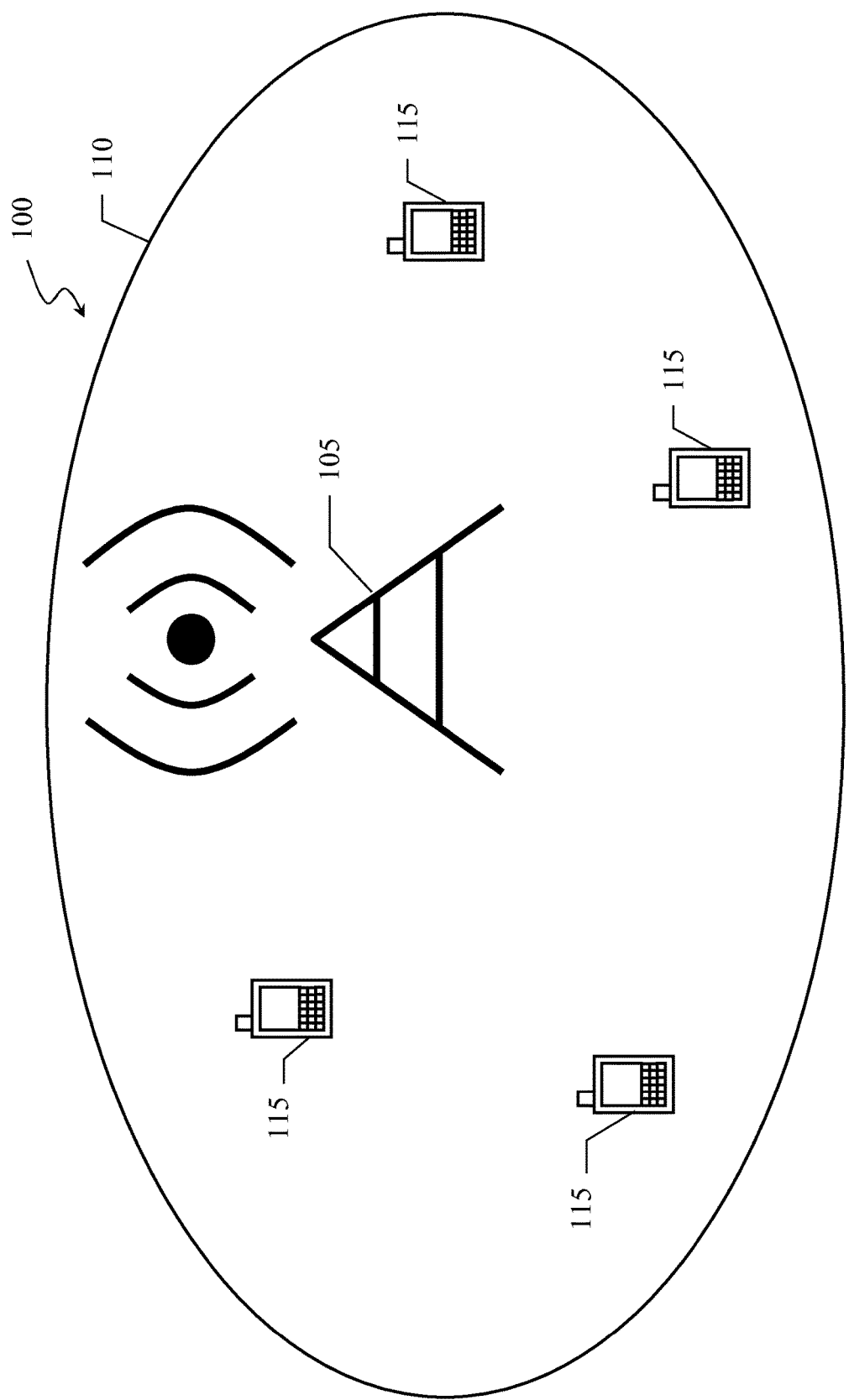

(58) Field of Classification Search
CPC ........... H04W 72/1231; H04W 72/048; H04W 52/146; H04W 52/242; H04W 72/10
See application file for complete search history.

(56) References Cited

U.S. PATENT DOCUMENTS

2013/0230019 A1  9/2013  Manssour et al.
2014/0341179 A1* 11/2014  Yokomakura ......... H04L 5/0037
                                                370/330

* cited by examiner

METHOD AND SYSTEM FOR ALLOCATING RADIO RESOURCES FOR UPLINK TRANSMISSION IN CELLULAR NETWORKS

BACKGROUND OF THE INVENTION

Field of the Invention

The solution according to one ore more embodiments of the invention generally relates to wireless communications networks, such as cellular networks. More particularly, the proposed solution relates to radio resources management for cellular networks, such as cellular networks based on LTE ("Long Term Evolution")/LTE-Advanced, WiMAX ("Worldwide Interoperability for Microwave Access") and any other OFDMA ("Orthogonal Frequency Division Multiple Access") based technologies.

Overview of the Related Art

The cellular networks, conceived for allowing high-speed transmission of data streams between a fixed-location transceiver base station (e.g., eNodeB in LTE/LTE-Advanced technology) defining a respective network cell, and user equipments (e.g., user terminals, such as cellular phones) within the network cell, have experimented a significant growth in terms of performance.

However, due to the growing number of cellular network users, and to the growing demand for services requiring very high data traffic (such as internet, multimedia and real-time services), cellular networks could not satisfy all quality requirements.

A common issue affecting most of the cellular networks is radio resources allocation among the data streams (so that corresponding radio frequency data signals, or data signals, are allowed to propagate between the base station and the user equipments).

As known, the radio resources allocation may be different for transmissions taking place from the base station to the user equipment (downlink transmissions) and for transmissions taking place from the user terminal to the base station (uplink transmissions).

In the state of the art, solutions are known aimed at providing radio resources allocation in uplink transmissions.

U.S. Pat. No. 7,778,217 discloses an uplink scheduling system and method in a wireless broadband internet communication system comprising: calculating priorities of mobile stations taking into account headroom size indicating transmission power additionally available for each of the mobile stations; and determining a transmission format of a mobile station selected to be preferentially allocated a slot as a result of the priority calculation, taking into account headroom size reported by the selected mobile station and a margin determined depending on a variation in channel state between the selected mobile station and a base station.

US2010/0271963 discloses a base station in an OFDMA system which determines a modulation and coding scheme to use for a packet of a certain size to be transmitted by a mobile station. The base station schedules transmissions by mobile stations and transmits packets. The base station includes a processing unit which determines a number of time-frequency resources required to transmit the packet for a modulation and coding scheme, determines a SINR based on the number of time-frequency resources used and available power at the mobile station, determines a transmission rate as a ratio of the packet size transmitted to the number of time-frequency resources used, sets a rate to zero if the determined SINR is lower than a threshold SINR required for the modulation and coding scheme, and selects the modulation and coding scheme with a highest transmission rate. The base station includes a memory storing modulation and coding schemes.

WO2012177189 discloses a method and a device for scheduling uplink transmission in a cellular radio system for a number of user equipments transmitting data over an air-interface, wherein each user equipment is associated with an individual uplink load factor. A cost function is formed based on the load factor for each user equipment that is to be scheduled for uplink transmission, wherein the cost function is approximated by a quadratic function. The throughput of all scheduled user equipments is maximized using a convex optimization of the sum of the individual cost functions, and the grant for uplink transmission is scheduled in accordance with the optimized cost functions.

SUMMARY OF INVENTION

The Applicant has recognized that none of the cited prior arts solutions is completely satisfactory. Indeed, in U.S. Pat. No. 7,778,217 and in US2010/0271963 the number of slots (i.e., radio resources) is allocated by taking into account radio channel quality, and the amount of data to be transmitted and transmission format thereof, respectively. In both cases, however, neither issues about user equipment transmission power are considered, nor optimization in terms of transmission power and radio quality estimated in uplink transmissions is contemplated. As far as WO2012177189 is concerned, no issues about number of radio resources to be allocated are considered.

In view of the above, the Applicant has tackled the problem of devising a simple and effective solution aimed at radio resources allocation among data streams in uplink transmission.

One or more aspects of the solution according to embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, one aspect of the solution according to embodiments of the present invention relates to a method for allocating, in a wireless communications network, radio resources for uplink transmissions. The method comprises:

selecting, among said radio resources, an allocation group comprising an ordered succession of radio resources available for allocation from a first radio resource to a last radio resource, iterating the following operations:

selecting the last radio resource of the allocation group, each last radio resource taking, at each iteration, a position in the ordered succession lower than the position taken in the ordered succession by the last radio resource at the respective previous iteration, estimating a signal to interference-plus-noise ratio per radio resource of the allocation group according to a number of radio resources of the allocation group, from the first to the last radio resources of the allocation group, and according to history transmissions information, and until the signal to interference-plus-noise ratio per radio resource is higher than a predetermined signal to interference-plus-noise ratio, allocating the radio resources from said first to said last radio resources of the allocation group.

According to an embodiment of the present invention, at each iteration, the position of the last radio resource is between minimum and maximum allowed positions, and said selecting the last radio resource of the allocation group further comprises:

setting, at each iteration, the maximum allowed position at the position of the last radio resource in the respective previous iteration.

According to an embodiment of the present invention, the method further comprises, if the signal to interference-plus-noise ratio per radio resource is higher than the predetermined signal to interference-plus-noise ratio:

repeating the following operations:
  selecting the last radio resource of the allocation group, each last radio resource taking, at each repetition, a position in the ordered succession higher than the position taken in the ordered succession by the last radio resource at the respective previous repetition/iteration, and
  estimating the signal to interference-plus-noise ratio per radio resource according to the number of radio resources of the allocation group, from the first to the last radio resources of the allocation group,
until the position of the last radio resource is higher than said maximum allowed position by a predefined number of positions.

According to an embodiment of the present invention, at each repetition, said selecting the last radio resource of the allocation group further comprises:

setting, at each repetition, the minimum allowed position at the position of the last radio resource in the respective previous repetition/iteration.

According to an embodiment of the present invention, if the position of the last radio resource is higher than a minimum last position, said selecting the last radio resource of the allocation group further comprises stopping any ongoing iteration or repetition, and
allocating the radio resources of the allocation group from said first radio resource to the radio resources at said minimum last position.

According to an embodiment of the present invention, the position of the last radio resource is, at each iteration and at each repetition, in an average position between the respective minimum and maximum allowed positions.

According to an embodiment of the present invention, said history transmissions information comprises an interference-plus-noise ratio estimate over all radio resources available for allocation based on a previous transmission, and said estimating a signal to interference-plus-noise ratio per radio resource comprises multiplying said signal to interference-plus-noise ratio estimate over all radio resources available for allocation by a scaling factor taking into account the number of radio resources of the allocation group.

According to an embodiment of the present invention, said scaling factor is the multiplicative inverse of the number of radio resources of the allocation group.

According to an embodiment of the present invention, said scaling factor depends on the ratio between a first transmission power that would be used for transmission on each radio resource of said number of radio resources of the allocation group, and a second transmission power that would be used for transmission on a single radio resource of said number of radio resources.

According to an embodiment of the present invention, said first and second transmission powers are calculated according to network parameters and to path loss estimates.

According to an embodiment of the present invention, the radio resources are distributed over transmission time intervals, the method being executed at each transmission time interval.

Another aspect of the solution according to embodiments of the present invention, relates to a wireless communications network comprising a station providing radio coverage over a network cell, said station comprising an allocation unit for determining allocation of radio resources for uplink transmissions. The allocation unit is configured for:

selecting, among said radio resources, an allocation group comprising an ordered succession of radio resources available for allocation from a first radio resource to a last radio resource, iterating the following operations:
  selecting the last radio resource of the allocation group, each last radio resource taking, at each iteration, a position in the ordered succession lower than the position taken in the ordered succession by the last radio resource at the respective previous iteration,
  estimating a signal to interference-plus-noise ratio per radio resource of the allocation group according to a number of radio resources of the allocation group, from the first to the last radio resources of the allocation group, and according to history transmissions information, until the signal to interference-plus-noise ratio per radio resource is higher than a predetermined signal to interference-plus-noise ratio, and allocating the radio resources from said first to said last radio resources of the allocation group.

According to an embodiment of the present invention, the wireless communications network is a cellular network based on LTE/LTE-Advanced technology.

The proposed solution allows allocation of an optimal number of radio resources, which takes into account both radio channel quality and user equipment transmission power (e.g., by means of "Signal to Interference-plus-Noise Ratio" and path loss estimates, as well as cellular network parameters).

Moreover, compatibility of the proposed solution with standard OSI ("Open Systems Interconnection") model requires no change to protocol stack (for example, resource allocation can be run at "Media Access Control" (MAC) layer as standard OSI model imposes).

Last but not least, low computational complexity required by the proposed solution makes it particularly adapted to be used in any cellular network, and at any side thereof (e.g., at base station sides, or any other cellular network side wherein resources allocation functionalities are implemented). Indeed, the proposed solution can be run at any point of the cellular network providing for radio resources allocation functionalities (such as eNodeBs of cellular networks based on LTE/LTE-Advanced). As an alternative, the proposed solution can be run at a separate entity wherein Level-2 processing is carried out (e.g. a base-band processing entity, or a MAC processing entity). As a further alternative, the proposed solution can be run at an external node of the "Radio Access Network" (RAN), for example in the case of "Cognitive-RAN" (C-RAN) deployment.

BRIEF DESCRIPTION OF THE ANNEXED DRAWINGS

Figure 2:
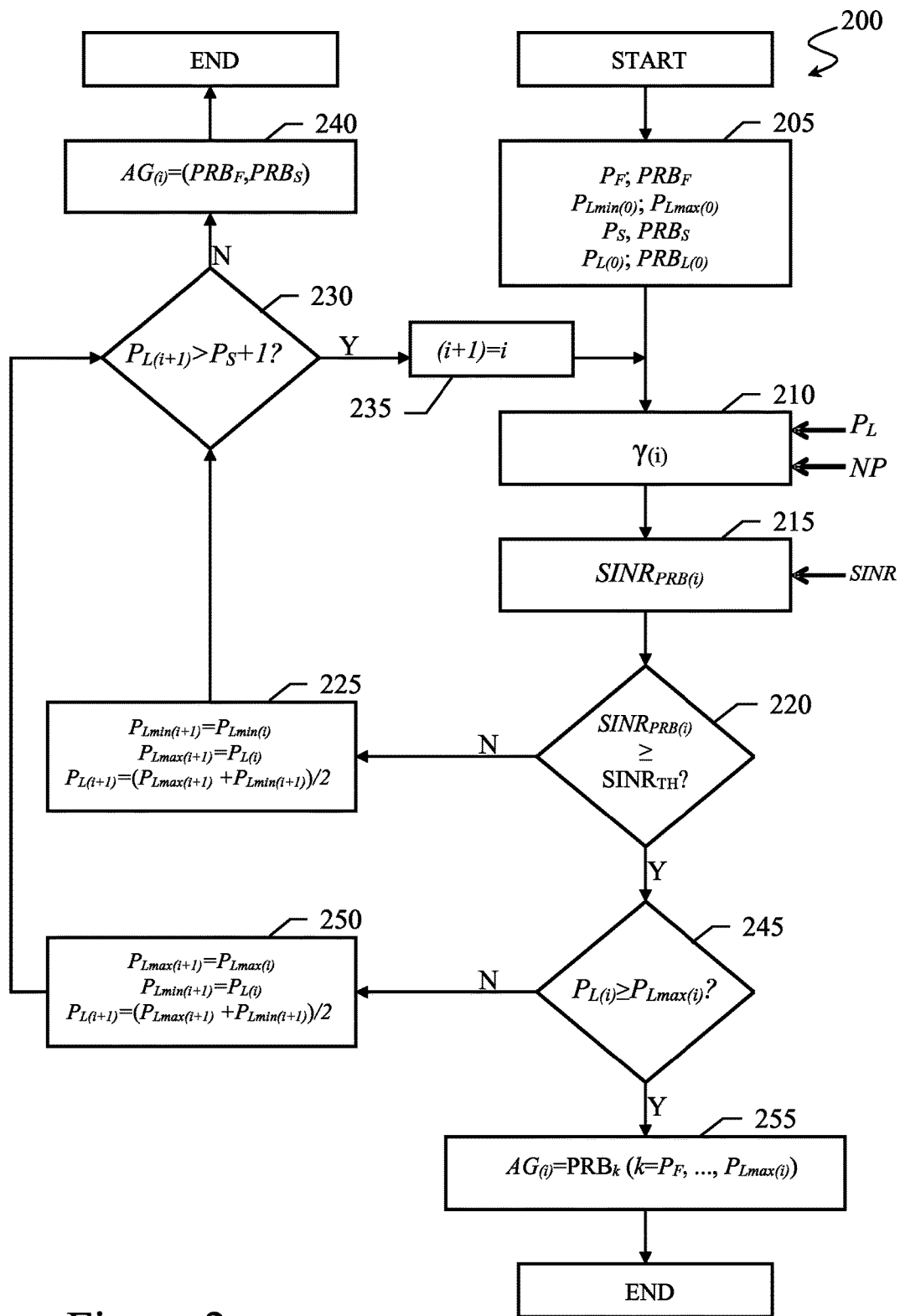

These and other features and advantages of the proposed solution will be made apparent by the following description of some exemplary and non limitative embodiments thereof;

for its better intelligibility, the following description should be read making reference to the attached drawings, wherein:

FIG. 1 schematically shows a cellular network portion wherein the solution according to one or more embodiments of the invention may be applied;

FIG. 2 schematically shows a flow chart illustrating an activity flow of an allocation algorithm according to an embodiment of the invention, and FIGS. 3A-3D schematically show exemplary positional and allocation variables configurations at corresponding iterations of the allocation algorithm, according to an embodiment of the invention.

DETAILED DESCRIPTION OF PREFERRED EMBODIMENTS OF THE INVENTION

With reference to the drawings, a cellular network 100 wherein the solution according to one or more embodiments of the invention may be applied is illustrated in FIG. 1. The cellular network 100 (e.g., compliant with the 3GPP LTE/LTE-Advanced standard) comprises a plurality (only one depicted in the figure) of fixed-location transceiver nodes or base stations (e.g., eNodeBs), such as the base station 105. One or more base stations, such as the base station 105, provide for radio coverage over a geographic area, also referred to as network cell, such as the network cell 110, for allowing user equipments (UEs) within the network cell (such as the UEs 115—e.g., mobile phones—within the network cell 110) to exchange data streams (e.g., web browsing, e-mailing, voice and/or multimedia data streams).

For the sake of completeness, as well known by those having ordinary skill in the art, the base station and the UEs, such as the base station 105 and the UEs 115, form, together, the radio access network. In turn, the radio access network is generally communicably coupled with one or more core networks (not shown), which may be coupled with other networks, such as Internet and/or public switched telephone networks (not illustrated).

According to an embodiment of the invention, the base station 105 (e.g., through an allocation unit thereof) is configured to autonomously implement an allocation algorithm aimed at proper radio resources allocation among the data streams in the network cell 110, for transmission thereof from the UEs 115 to the base station 105 (uplink transmission). As usual, thanks to radio resources allocation among the data streams, propagation of corresponding radio frequency data signals (or data signals) is allowed (from the UEs 115 to the base station 105, in the scenario herein considered).

In the following, radio resources allocation according to 3GPP LTE/LTE-Advanced specifications will be considered by way of example only. According to 3GPP LTE/LTE-Advanced specifications, radio resources are allocated in time/frequency domain. In time domain, radio resources are distributed every "Transmission Time Interval" (TTI), each one lasting 1 ms and comprising two time slots of 0.5 ms, whereas in frequency domain the whole bandwidth is divided into 180-kHz sub-channels (corresponding to 12 consecutive and equally spaced sub-carriers). A time/frequency radio resource, spanning over one TTI lasting 1.0 ms in time domain and over one sub-channel in frequency domain, will be referred to as "Physical Resources Block" (PRB), and corresponds to the smallest radio resource that can be allocated to a UE for data transmission.

With reference now to FIG. 2, it schematically shows a flow chart illustrating an activity flow of an allocation algorithm 200 according to an embodiment of the invention.

For the sake of description ease, reference will be also made to FIGS. 3A-3D, which schematically show exemplary position and allocation variables configurations at corresponding iterations of the allocation algorithm 200.

Figure 3A:
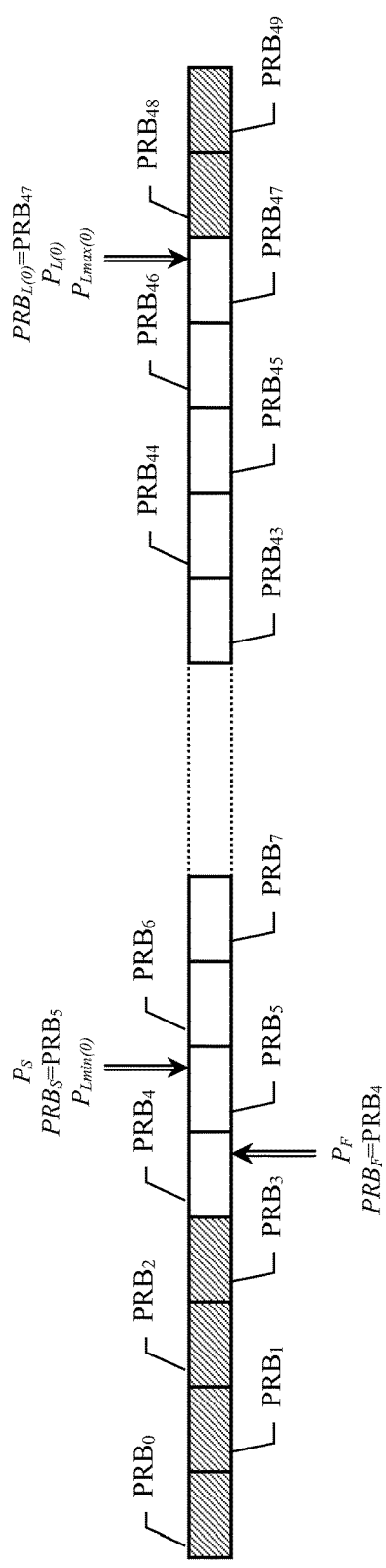

Let the scenario illustrated in FIG. 3A be considered, conceptually showing an ordered succession of adjacent PRBs $PRB_k$ (k=0, 1, 2, with N=50 in the example at issue) comprising (e.g., uplink) PRBs available for allocation (hereinafter, available PRBs) and PRBs not available for allocation (hereinafter, non-available PRBs). In the considered example, the available PRBs (illustrated in the figure as generic white blocks) range with continuity from a first available PRB $PRB_4$ to a last available PRB $PRB_{47}$, whereas the non-available PRBs (illustrated in the figure as generic blocks with a graphic effect for visually differentiating them from the available PRBs) range from PRB $PRB_0$ to PRB $PRB_3$ and from PRB $PRB_{48}$ to PRB $PRB_{49}$. By definition, k also denotes the positional index of the succession of PRBs $PRB_k$ (i.e., the PRB $PRB_k$ is the PRB in the k-th position of the succession).

At each working period (e.g., at each TTI), the allocation algorithm 200 is intended to determine, between the first $PRB_4$ and last $PRB_{47}$ available PRBs, allocation of a group of (e.g., a number of two or more) adjacent available PRBs $PRB_k$ (hereinafter, allocation group). As will be best discussed below, determining an optimal allocation group may require a number of repetitions, or iterations, i, wherein, at each i-th iteration, a new, potential allocation group $AG_{(i)}$ is considered and allocation thereof is assessed. In order to achieve that, the allocation algorithm 200 takes advantage of a number of positional $P_F$, $P_S$, $P_{L(i)}$, $P_{Lmin(i)}$, $P_{Lmax(i)}$ and allocation $PRB_F$, $PRB_S$, $PRB_{L(i)}$ variables, as indicated below:

$P_F$: the position (in the succession) of the first PRB of the allocation group $AG_{(i)}$ (hereinafter, first allocation PRB $PRB_F$). In other words, the position $P_F$ (and the available PRB $PRB_k$ in that position, set as the first allocation PRB $PRB_F$) define a lower boundary of the allocation group $AG_{(i)}$. As herein assumed by way of example only, the first allocation PRB $PRB_F$ does not depend on the number of iterations, i.e. it defines the same lower boundary for all considered allocation groups $AG_{(i)}$.

$P_S$: the lowest position (in the succession) of the last PRB of the allocation group $AG_{(i)}$ that can be allocated (hereinafter, lowest last allocation PRB $PRB_S$). In other words, the position $P_S$ (and the available PRB $PRB_k$ in that position, i.e. the lowest last allocation PRB $PRB_S$) define the lowest upper boundary of the allocation group $AG_{(i)}$ (i.e. the first $PRB_F$ and lowest last $PRB_S$ allocation PRBs define the narrowest allocation group $AG_{(i)}$ that can be allocated). As herein assumed by way of example only, the lowest last allocation PRB $PRB_S$ does not depend on the number of iterations, i.e. it defines the lowest upper boundary for all considered allocation groups $AG_{(i)}$.

$P_{L(i)}$: the position (in the succession) of the last PRB of the allocation group $AG_{(i)}$ (hereinafter, last allocation PRB $PRB_{L(i)}$, whose allocation is under assessment. In other words, the allocation group $AG_{(i)}$ considered at the i-th iteration ranges from the available PRB $PRB_k$ set as the first allocation PRB $PRB_F$ to the available PRB $PRB_k$ set as the last allocation PRB $PRB_{L(i)}$, and comprises a number $Q_{(i)}$ of available PRBs $PRB_k$ (also referred to as allocation PRBs in the following). As better discussed in the following, in order to progressively (and effectively) update the allocation group $AG_{(i)}$ (so as to identify the optimal allocation group), the position $P_{L(i)}$ of the last allocation PRB $PRB_{L(i)}$ is varied, at each i-th iteration, within minimum $P_{Lmin(i)}$ and maximum $P_{Lmax(i)}$ allowed positions.

$P_{Lmax(i)}$: the maximum allowed position (in the succession) for the last allocation PRB $PRB_{L(i)}$ of the allocation group $AG_{(i)}$, at the i-th iteration. As better discussed in the following, the maximum allowed position $P_{Lmax(i)}$ is varied, at each i-th iteration, when the position $P_{L(i)}$ of the last allocation PRB $PRB_{L(i)}$ has to be decreased with respect to the previous iteration.

$P_{Lmin(i)}$: the minimum allowed position (in the succession) for the last allocation PRB $PRB_{L(i)}$ of the allocation group $AG_{(i)}$, at the i-th iteration. As better discussed in the following, the minimum allowed position $P_{Lmin(i)}$ is varied, at each i-th iteration, when the position $P_{L(i)}$ of the last allocation PRB $PRB_{L(i)}$ has to be increased with respect to the previous iteration.

Operation of the allocation algorithm 200 can be summarized as follows.

At the activity block 205, initialization (i.e., first assigning) of the positional $P_F$, $P_S$, $P_{L(i)}$, $P_{Lmin(i)}$, $P_{Lmax(i)}$ and allocation $PRB_F$, $PRB_S$, $PRB_{L(i)}$ variables before any (possible) iteration (i=0) is exemplary performed as follows (and conceptually shown in FIG. 3A)—it is worth noting that the numerical values may also differ according to the total number of PRBs and of available PRBs among them:

$P_F=4$ (thus, $PRB_F=PRB_4$). The first available PRB $PRB_4$ is set as the first allocation PRB $PRB_F$ of the allocation group $AG_{(0)}$;

$P_S=5$ (thus, $PRB_S=PRB_5$). The available PRB $PRB_5$ (adjacent, and immediately following the first available PRB $PRB_4$, hereinafter second available PRB $PRB_5$) is set as lowest last allocation PRB $PRB_S$;

$P_{Lmax(0)}=47$. The position of the last available PRB $PRB_{47}$ is set as the maximum allowed position $P_{Lmax(0)}$ (of the last allocation PRB $PRB_{L(0)}$ of the allocation group $AG_{(0)}$;

$P_{Lmin(0)}=5$. The position of the second available PRB $PRB_5$ is set as the minimum allowed position $P_{Lmin(0)}$ (of the last allocation PRB $PRB_{L(0)}$ of the allocation group $AG_{(0)}$);

$P_{L(0)}=47$ (thus, $PRB_{L(0)}=PRB_{47}$). The last available PRB $PRB_{47}$ is set as the last allocation PRB $PRB_{L(0)}$ of the allocation group $AG_{(0)}$. As mentioned above, the available PRBs $PRB_k$ set as the first $PRB_F$ and last $PRB_{L(0)}$ allocation PRBs, define, together with the available PRBs $PRB_k$ therebetween, the allocation group $AG_{(0)}$.

Initialization performed at the activity block 205, substantially based on full-exploitation of all available PRBs $PRB_k$, should not be construed limitatively. Indeed, any other initialization criterion may be chosen according to specific design parameters (e.g., implementation of the cellular network 100, and/or standard specifications), so that other available PRBs $PRB_k$ might be chosen as first $PRB_F$, lowest last $PRB_S$ and last $PRB_{L(0)}$ allocation PRBs of the allocation group $AG_{(0)}$, and other positions of the succession might be chosen as maximum $P_{Lmax(0)}$ and minimum $P_{Lmin(0)}$ allowed positions in the allocation group $AG_{(0)}$. Particularly, initialization performed at the activity block 205 may be based on partial-exploitation of all available PRBs $PRB_k$. By way of example only, in order to allocate the highest number of available PRBs $PRB_k$ possible, the first $PRB_F$, lowest last PRBs and last $PRB_{L(0)}$ allocation PRBs may be chosen among the available PRBs $PRB_k$ in the second half of the succession (e.g., from the available PRB $PRB_{25}$ to the available PRB $PRB_{49}$) in which case the resulting allocation could be sub-optimal (as an optimal allocation should have included available PRBs $PRB_k$ in the first half of the succession) but would advantageously require shorter processing time.

The following steps, performed at the activity 210-215 and decision 220 blocks, apply, before any iteration (i=0), i.e. when the allocation group $AG_{(0)}$ is under assessment, as well as, when required, to the first iteration (i=1), i.e. when the allocation group $AG_{(0)}$ is negatively assessed, and to iterations following the first, i.e. until an allocation group $AG_{(i)}$ is positively assessed. This is conceptually shown, in the figure, by loop connection (through the activity 225,235 and decision 230 blocks) between the decision 220 and activity 210 blocks.

Figure 3B:
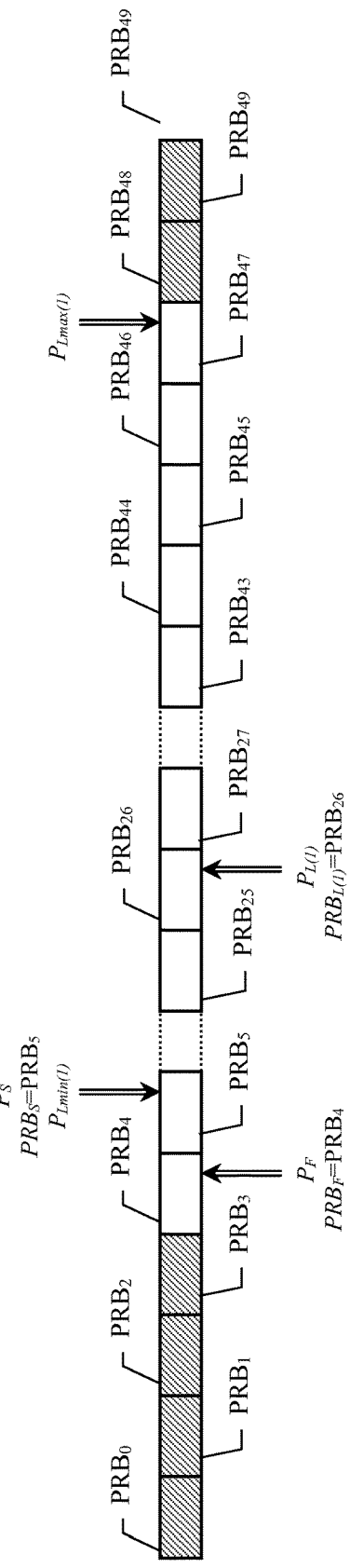
Figure 3C:
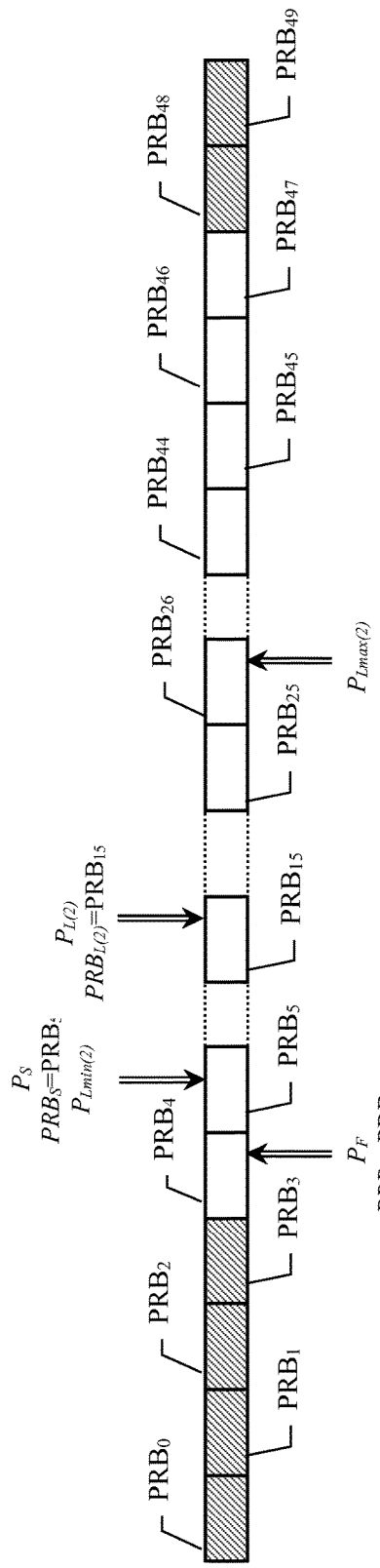
Figure 3D:
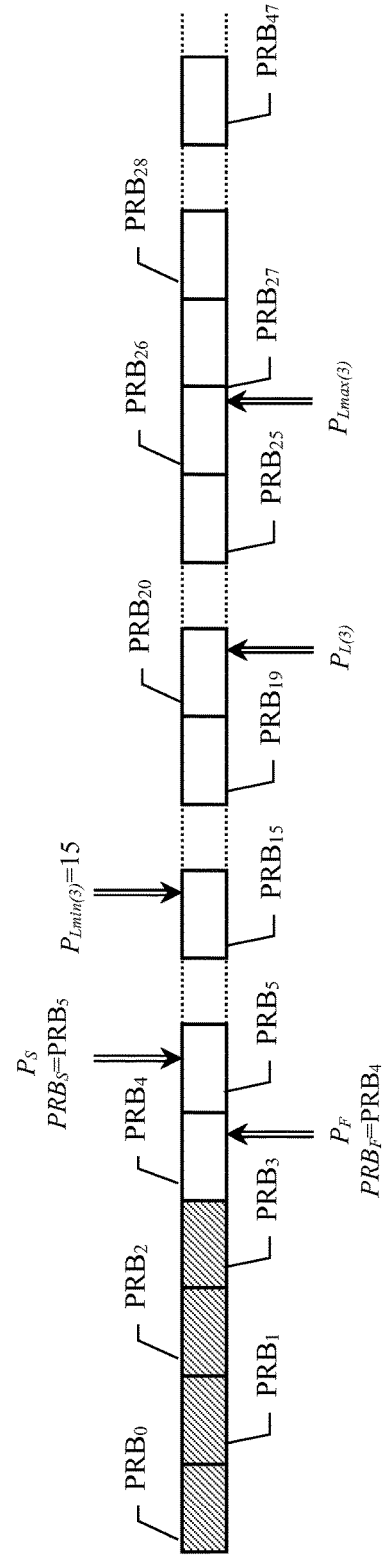

For the sake of conciseness, the allocation algorithm 200 will be now discussed by making reference to a generic i-th iteration (it being understood that, in some cases, no iterations could be necessary), while discussing, as practical examples, the first, second and third iterations (shown in FIGS. 3B, 3C and 3D, respectively).

At the activity blocks 210-215, an estimate of a "Signal to Interference-plus-Noise Ratio" (SINR) per PRB (hereinafter, $SINR_{PRB(i)}$ (estimate) is performed, i.e. the estimate, at the i-th iteration, of the ratio between the power of the data stream transmitted from a UE 115 to the base station 105, and the power of interfering data streams (transmitted from all other UEs 115 within the network cell 110 to the base station 105) added to the power of background noise, assuming that transmission on a single allocation PRB among the $Q_{(i)}$ allocation PRBs of the allocation group $AG_{(i)}$ is performed.

In order to achieve that, a scaling factor $\gamma_{(i)}$ (that, as a result of allocation group $AG_{(i)}$ changing/updating at each i-th iteration, depends on the ongoing i-th iteration) is first calculated at the activity block 210.

According to a first embodiment, the scaling factor $\gamma_{(i)}$ can be calculated as the multiplicative inverse (i.e., reciprocal) of the number $Q_{(i)}$ of allocation PRBs of the allocation group $AG_{(i)}$, i.e. $\gamma_{(i)}=1/Q_{(i)}$, under the assumption that each UE 115 transmits at maximum transmission power and that such transmission power is divided proportionally among the $Q_{(i)}$ allocation PRBs of the allocation group $AG_{(i)}$.

According to a second embodiment, the scaling factor $\gamma_{(i)}$ can be calculated by taking into account the ratio between the transmission power that each UE 115 would use for transmission on each one of the $Q_{(i)}$ allocation PRBs of the allocation group $AG_{(i)}$ (hereinafter, transmission power $T_{Q(i)}$ assuming to transmit on all the allocation PRBs of the allocation group $AG_{(i)}$ according to network parameters NP (as specified by 3GPP LTE/LTE-Advanced specifications) and to path loss estimates $P_L$ (the latter taking into account power reduction/attenuation affecting propagation between the UE 115 and the base station 105), and the transmission power that each UE 115 would use for transmission on a single allocation PRB of the $Q_{(i)}$ allocation PRBs of the allocation group $AG_{(i)}$ (hereinafter, transmission power $T_{PRB(i)}$) according to said network parameters NP and said path loss estimates $P_L$, i.e. $\gamma_{(i)}=T_{Q(i)}/T_{PRB(i)}$.

Determination of the path loss estimates $P_L$, per se well known in the art, are based (as usual) by taking into account power measures (performed by the UE 115) of reference signals—specifically, the path loss estimates $P_L$ depend on the ratio between transmitted and received powers of said reference signals. As illustrated in FIG. 2, the path loss estimates $P_L$ are input to the activity block 210.

Determination of the transmission powers $T_{Q(i)}$ and $T_{PRB(i)}$, per se well known in the art as well, will not be discussed for the sake of conciseness. According to standard specification 3GPP TS 36.213 (herein considered by way of example only), the transmission powers $T_{Q(i)}$ and $T_{PRB(i)}$ are determined according to the number $Q_{(i)}$ of allocation PRBs of the allocation group $AG_{(i)}$, to the path loss estimates $P_L$ and to the network parameters NP—as conceptually illustrated in FIG. 2, wherein also the network parameters NP are input to the activity block 210.

In order to achieve the $SINR_{PRB(i)}$ estimate (activity block 215), said scaling factor $\gamma_{(i)}$ is multiplied by (i.e., applied to) a SINR estimate, the latter indicating the "Signal to Interference-plus-Noise Ratio" estimated in uplink transmission between the UE 115 and the base station 105. Such a SINR estimate relates to previous data streams transmissions (e.g., the transmission before the transmission that will take place according to the ongoing radio resources allocation). In other words, the SINR estimate carries history transmission information with it, so that the $SINR_{PRB(i)}$ estimate, which in turn depends on the SINR estimate, is advantageously based on said history transmission information.

Determination of the SINR estimate, per se well known in the art, is not limiting for the invention, and substantially depends on the ratio between the power of the data signals and the sum of the power of interfering signals and the power of background noise. By way of example only, the SINR estimate may be determined (e.g., preliminarily at base station 105 side—such as during a previous transmission from the UE 115 to the base station 105—and input to the activity block 215, as illustrated) according to an average number of the PRBs used for transmission, according to the maximum transmission power associated with the UE 115, and/or according to the transmission power that the UE 115 would use for transmission on a single PRB based on the path loss estimates $P_L$. The present embodiment is herein discussed under the exemplary and not limiting assumption that the SINR estimate is normalized to the case of transmission of a single PRB.

At the decision block 220, a check is performed for assessing whether the $SINR_{PRB(i)}$ estimate, related to the (current) number $Q_{(i)}$ of allocation PRBs of the (current) allocation group $AG_{(i)}$, is higher than a threshold SINR estimate (hereinafter, $SINR_{TH}$ estimate)—indicating that, by allocating the $Q_{(i)}$ allocation PRBs of the allocation group $AG_{(i)}$, desired transmission quality in terms of "Signal to Interference-plus-Noise Ratio" can be achieved—or not. Preferably, the threshold $SINR_{TH}$ estimate is derived from a threshold parameter (not indicated) multiplied by the scaling factor $\gamma_{(i)}$.

In the negative case, exit branch N of the decision block 220, the (following) (i−1)-th iteration is started (by defining the following allocation group $AG_{(i+1)}$, and the position $P_{L(i+1)}$ of the last allocation PRB $PRB_{L(i+1)}$), and the steps performed at the activities blocks 210 and 215 are repeated/iterated for the allocation group $AG_{(i+1)}$, unless (as better discussed below) the first $PRB_F$ and last $PRB_{L(i+1)}$ allocation PRBs identify the narrowest allocation group $AG_{(i+1)}$.

In order to define the allocation group $AG_{(i+1)}$, the positional $P_{Lmin(i+1)}$, $P_{Lmax(i+1)}$, $P_{L(i+1)}$ and allocation $PRB_{L(i+1)}$ variables are updated as follows (activity block 225):

$P_{Lmin(i+1)} = P_{Lmin(i)}$. The minimum allowed position $P_{Lmin(i+1)}$ for the last allocation PRB $PRB_{L(i+1)}$ is unchanged with respect to the minimum allowed position $P_{Lmin(i)}$ for the last allocation PRB $PRB_{L(i)}$;

$P_{Lmax(i+1)} = P_{L(i)}$. The position $P_{L(i)}$ of the last allocation PRB $PRB_{L(i)}$ of the allocation group $AG_{(i)}$ of the i-th iteration (i.e., the previous iteration) is set as maximum allowed position $P_{Lmax(i+1)}$ for the last allocation PRB $PRB_{L(i+1)}$ of the allocation group $AG_{(i+1)}$ of the (i+1)-th iteration (i.e., the current iteration). In other words, the maximum upper boundary of the allocation group $AG_{(i+1)}$ is decreased with respect to the maximum upper boundary of the allocation group $AG_{(i)}$;

$P_{L(i+1)} = (P_{Lmax(i+1)} + P_{Lmin(i+1)})/2$. The position of the last allocation PRB $PRB_{L(i+1)}$ of the allocation group $AG_{i+1}$ is set at a position (in the succession) between the maximum $P_{Lmax(i+1)}$ and minimum $P_{Lmin(i+1)}$ allowed positions, preferably in the middle therebetween. Thus, the first $PRB_F$ and last $PRB_{L(i+1)}$ allocation PRBs identify, together with the available PRBs $PRB_k$ therebetween, the $Q_{(i+1)}$ allocation PRBs of the allocation group $AG_{(i+1)}$).

In the practical example of FIG. 3B, showing setting of the positional $P_{Lmin(1)}$, $P_{Lmax(1)}$, $P_{L(1)}$ and allocation $PRB_{L(1)}$ variables at the first iteration ((i+1)=1), $P_{Lmax(1)} = 47$;
$P_{Lmin(1)} = 5$;
$P_{L(1)} = 26$ (thus, $PRB_{L(1)} = PRB_{26}$);

whereas, in the practical example of FIG. 3C, showing setting of the positional $P_{Lmin(2)}$, $P_{Lmax(2)}$, $P_{L(2)}$ and allocation $PRB_{L(2)}$ variables at the second iteration ((i+1)=2), $P_{Lmax(2)} = 26$
$P_{Lmin(2)} = 5$
$P_{L(2)} = 15$ (thus, $PRB_{L(2)} = PRB_{15}$)

In other words, with the course of iterations, each following allocation group $AG_{(i+1)}$ is progressively narrowed (with respect to the previous allocation group $AG_{(i)}$) by lowering the maximum upper boundary thereof (i.e., the maximum allowed position $P_{Lmax(i+1)}$) for the same minimum upper boundary (i.e., the minimum allowed position $P_{Lmin(i+1)}$) and by setting, according to a bisection criterion, the position $P_{L(i+1)}$ of the last allocation PRB $PRB_{L(i+1)}$ of the allocation group $AG_{(i+1)}$ between (e.g., in the middle of) the minimum upper boundary and the lowered maximum upper boundary. Thanks to that, narrowing of each allocation group is carried out, at each iteration, by halving, so that the number of iterations needed for narrowing the allocation group is halved as well. As a result, determination of the allocation PRBs to be allocated takes reduced (e.g., logarithmic) running times.

As should be readily understood, if $(P_{Lmax(i+1)} + P_{Lmin(i+1)})/2$ provides a non-integer position $P_{L(i+1)}$ (as for FIG. 3C example), the (adjacent) immediately preceding or following integer positions may be chosen according to any proper criterion. By way of example only, when narrowing of the allocation group $AG_{(i+1)}$ is performed by increasing the position $P_{L(i+1)}$ of the last allocation PRB $PRB_{L(i+1)}$ (with respect to the position $P_{L(i)}$ of the last allocation PRB $PRB_{L(i)}$), the immediately following integer may be chosen, so as to consider the widest possible allocation group $AG_{(i)}$. For the same reason, when narrowing of the allocation group $AG_{(i+1)}$ is performed by decreasing the position $P_{L(i+1)}$ of the last allocation PRB $PRB_{L(i+1)}$ (with respect to the position $P_{L(i)}$ (of the last allocation PRB $PRB_{L(i)}$), the immediately preceding integer may instead be chosen.

Then, at the decision block 230, a check is performed for assessing whether the first $PRB_F$ and last $PRB_{L(i+1)}$ allocation PRBs identify the narrowest allocation group $AG_{(i+1)}$), namely if the position $P_{L(i+1)}$ of the last allocation PRB $PRB_{L(i+1)}$ of the allocation group $AG_{(i+1)}$ follows the lowest last allocation PRB PRBs by a predefined number (e.g., 1) of positions i.e.:

$$P_{L(i+1)} > (P_S + 1)$$

If the inequality of above is satisfied (exit branch Y of the decision block 230), the activity flow jumps back to activity block 210, whereby steps 210-215 are repeated for the (i+1)-th iteration. In this case, the (i+1)-th iteration becomes the new current (i-th) iteration. This is conceptually represented in FIG. 2 by the activity block 235 (placed between the decision 230 and activity 210 blocks), intended to "set", by the logical viewpoint, the (i+1)-th iteration as the current i-th iteration—i.e. (i+1)=i.

Steps 210-215 are performed for each (i+1)-th iteration as long as $P_{L(i+1)} > (P_S+1)$. Otherwise, exit branch N of the decision block 230, iterations are stopped (as the narrowest allocation group $AG_{(i+1)}$ has been considered) and the $Q_{(i+1)}$ allocation PRBs of the allocation group $AG_{(i+1)}$ are allocated (activity block 240), thereafter the allocation algorithm 200 ends. In the practical example herein considered, the narrowest allocation group $AG_{(i+1)}$ comprises the first $PRB_4$ and second $PRB_5$ available PRBs, thus the first $PRB_4$ and second $PRB_5$ available PRBs would be allocated at the activity block 240.

As above-mentioned, steps at blocks 210-240 are performed until $SINR_{PRB(i)} > SINR_{TH}$. Indeed, back to decision block 220, if (or, as soon as) the $SINR_{PRB(i)}$ estimate, related to the (current) number $Q_{(i)}$ of allocation PRBs of the allocation group $AG_{(i)}$, is higher than the $SINR_{TH}$ estimate (exit branch Y)—indicating that the desired transmission quality in terms of "Signal to Interference-plus-Noise Ratio" are met by the $Q_{(i)}$ allocation PRBs of the allocation group $AG_{(i)}$—another check is performed (decision block 245) for assessing whether the number $Q_{(i)}$ of allocation PRBs that meet "Signal to Interference-plus-Noise Ratio" requirements is the highest possible (thus optimal in terms of transmission capabilities) in the range between the position $P_F$ of the first allocation PRB $PRB_F$ and the maximum allowed position $P_{Lmax(i)}$, namely if the position $P_{L(i)}$ of the last allocation PRB $PRB_{L(i)}$ is equal to, or higher than, the maximum allowed position $P_{Lmax(i)}$ (by less than a predefined number, e.g. 0, of positions):

$$P_{L(i)} \geq P_{Lmax(i)}$$

In the negative case, exit branch N of the decision block 245, a new (i+1)-th iteration is started (by identifying the following allocation group $AG_{(i+1)}$ and the position $P_{L(i+1)}$ of the last allocation PRB $PRB_{L(i+1)}$ at the activity block 250), and the steps performed at activities 230,235,210-215 and decision 220,245 blocks are repeated/iterated for the allocation group $AG_{(i+1)}$, unless (as discussed above) the first $PRB_F$ and last $PRB_{L(i+1)}$ allocation PRBs of the allocation group $AG_{(i+1)}$ identify the narrowest allocation group $AG_{(i+1)}$ (decision block 230), or the $SINR_{PRB(i)}$ estimate is lower than the $SINR_{TH}$ estimate).

In this respect, since (as will be better understood shortly) the position $P_{L(i+1)}$ of the last allocation PRB $PRB_{L(i+1)}$ of the allocation group $AG_{(i+1)}$ identified at the activity block 250 at the (i+1)-th iteration is increased with respect to the position $P_{L(i)}$ of the last allocation PRB $PRB_{L(i)}$ of the allocation group $AG_{(i)}$ at the i-th iteration, occurrence that the allocation group $AG_{(i+1)}$ does not meet the "Signal to Interference-plus-Noise Ratio" requirements any longer may happen. In this case, steps at blocks 210-240 are iterated again (exactly as discussed above) until a new allocation group $AG_{(i)}$ meeting the "Signal to Interference-plus-Noise Ratio" requirements is identified.

Back to the activity block 250, in order to define the allocation group $AG_{(i+1)}$, the positional $P_{Lmin(i+1)}$, $P_{Lmax(i+1)}$, $P_{L(i+1)}$ and allocation $PRB_{L(i+1)}$ variables are updated as follows:

$P_{Lmax(i+1)} = P_{Lmax(i)}$. The maximum allowed position $P_{Lmax(i+1)}$ of the last allocation PRB $PRB_{L(i+1)}$ of the allocation group $AG_{(i+1)}$ is unchanged with respect to the maximum allowed position $P_{Lmax(i)}$ of the last allocation PRB $PRB_{L(i)}$ of the allocation group $AG_{(i)}$;

$P_{Lmin(i+1)} = P_{L(i)}$. The position $P_{L(i)}$ of the last allocation PRB $PRB_{L(i)}$ of the allocation group $AG_{(i)}$ of the i-th iteration (i.e., the previous iteration) is set as minimum allowed position $P_{Lmin(i+1)}$ of the allocation group $AG_{(i+1)}$ of the (i+1)-th iteration (i.e., the current iteration). In other words, the minimum upper boundary of the allocation group $AG_{(i+1)}$ is increased with respect to the minimum upper boundary of the allocation group $AG_{(i)}$;

$P_{L(i+1)} = (P_{Lmax(i+1)} + P_{Lmin(i+1)})/2$. The position of the last allocation PRB $PRB_{L(i+1)}$ of the allocation group $AG_{(i+1)}$ is set at a position (in the succession) between the maximum $P_{Lmax(i+1)}$ and minimum $P_{Lmin(i+1)}$ allowed positions, preferably in the middle thereof. Thus, being the minimum upper boundary of the allocation group $AG_{(i+1)}$ increased with respect to the minimum upper boundary of the allocation group $AG_{(i)}$, the position $P_{L(i+1)}$ of the last allocation PRB $PRB_{L(i+1)}$ of the allocation group $AG_{(i+1)}$ is increased as well. As before, the first $PRB_F$ and last $PRB_{L(i+1)}$ allocation PRBs identify, together with the available PRBs $PRB_k$ therebetween, the $Q_{(i+1)}$ allocation PRBs of the allocation group $AG_{(i+1)}$).

In the practical example of FIG. 3D, showing setting of the positional $P_{Lmin(3)}$, $P_{Lmax(3)}$, $P_{L(3)}$ and allocation $PRB_{L(3)}$ variables at the third iteration ((i+1)=3, assuming that the third iteration starts at the activity block 250):

$P_{Lmax(3)} = 26$ $P_{Lmin(3)} = 15$ $P_{L(3)} = 20$ (thus, $PRB_{L(3)} = PRB_{20}$)

In other words, with the course of iterations starting at the activity block 250, each following allocation group $AG_{(i+1)}$ is progressively widened by increasing the position $P_{L(i+1)}$ of the last allocation PRB $PRB_{L(i+1)}$ of the allocation group $AG_{(i+1)}$ with respect to the position $P_{L(i)}$ of the last allocation PRB $PRB_{L(i)}$. This is achieved by increasing (with respect to the allocation group $AG_{(i)}$) the minimum upper boundary of the allocation group $AG_{(i+1)}$ (i.e., the minimum allowed position $P_{Lmin(i+1)}$) for the same maximum upper boundary (i.e., the maximum allowed position $P_{Lmin(i+1)}$) and by setting the position $P_{L(i+1)}$ of the last allocation PRB $PRB_{L(i+1)}$ of the allocation group $AG_{(i+1)}$ between maximum upper boundary (the same as the previous iteration) and the minimum upper boundary (increased with respect to the previous iteration), according to the bisection criterion. Thanks to that, a reduced number of iterations (and, hence, of running times) is needed for widening the allocation group until the optimal allocation group is identified.

Thus, thanks to iterations starting at the activity blocks 225 and 250, optional allocation group can be dichotomously determined by progressively narrowing and widening the allocation group based on "Signal to Interference-plus-Noise Ratio" requirements and on history transmission information (indeed, as discussed above, the SINR estimate is based on previous transmissions).

Back to decision block 245, if the number $Q_{(i)}$ of allocation PRBs that meet "Signal to Interference-plus-Noise Ratio" requirements is the highest possible in the range between the position $P_F$ of the first allocation PRB $PRB_F$ and the maximum allowed position $P_{Lmax(i)}$ (exit branch Y of the decision block 245), the $Q_{(i)}$ allocation PRBs of the allocation group $AG_{(i)}$ are allocated (activity block 255), thereafter the allocation algorithm 200 ends.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to a cellular network based on the LTE/LTE-Advanced standard, it should be understood that it is not in the intentions of the Applicant to be limited to the implementation of any particular wireless communication system architecture or protocol. In this respect, it is also possible to provide that, with suitable simple modifications, the proposed allocation algorithm may be applied also to other open or proprietary communication protocols, for example, WiMAX and other OFDMA based systems, among them. In general, the proposed solution may be applied to any cellular network providing radio resources arranged in frequency slots.

The invention claimed is:

1. A method for allocating, in a wireless communications network, radio resources for uplink transmissions, the method comprising:
    selecting, among said radio resources, an allocation group comprising an ordered succession of radio resources available for allocation from a first radio resource to a last radio resource; and
    iteratively performing:
    selection of the last radio resource of the allocation group, each last radio resource taking, at each iteration, a position in the ordered succession lower than a position taken in the ordered succession by the last radio resource of an immediately previous iteration,
    estimation of a signal to interference-plus-noise ratio per radio resource of the allocation group according to a number of radio resources of the allocation group, from the first to the last radio resources of the allocation group, and according to history transmissions information, the estimation of the signal to interference-plus-noise ratio including multiplying the signal to interference-plus-noise ratio by a scaling factor that is based on a number of radio resources in the allocation group, and
    until the signal to interference-plus-noise ratio per radio resource is higher than a predetermined signal to interference-plus-noise ratio, allocation of the radio resources from said first to said last radio resources of the allocation group.

2. The method according to claim 1, wherein, at each iteration, the position of the last radio resource is between minimum and maximum allowed positions, and wherein said selecting the last radio resource of the allocation group further comprises:
    setting, at each iteration, the maximum allowed position at the position of the last radio resource in the respective previous iteration.

3. The method according to claim 2, further comprising, if the signal to interference-plus-noise ratio per radio resource is higher than the predetermined signal to interference-plus-noise ratio:
    repeatedly performing:
    selection of the last radio resource of the allocation group, each last radio resource taking, at each repetition, a position in the ordered succession higher than the position taken in the ordered succession by the last radio resource at the respective previous repetition/iteration, and
    estimation of the signal to interference-plus-noise ratio per radio resource according to the number of radio resources of the allocation group, from the first to the last radio resources of the allocation group, until the position of the last radio resource is higher than said maximum allowed position by a predefined number of positions.

4. The method according to claim 3, wherein, at each repetition, said selecting the last radio resource of the allocation group further comprises:
    setting, at each repetition, the minimum allowed position at the position of the last radio resource in the respective previous repetition/iteration.

5. The method according to claim 2, wherein if the position of the last radio resource is higher than a minimum last position, said selecting the last radio resource of the allocation group further comprises:
    stopping any ongoing iteration or repetition, and
    allocating the radio resources of the allocation group from said first radio resource to the radio resources at said minimum last position.

6. The method according to claim 2, wherein the position of the last radio resource is, at each iteration and at each repetition, in an average position between the respective minimum and maximum allowed positions.

7. The method according to claim 1, wherein said history transmissions information comprises an interference-plus-noise ratio estimate over all radio resources available for allocation based on a previous transmission, and wherein said estimating a signal to interference-plus-noise ratio per radio resource comprises multiplying said signal to interference-plus-noise ratio estimate over all radio resources available for allocation by the scaling factor.

8. The method according to claim 7, wherein said scaling factor is the multiplicative inverse of the number of radio resources of the allocation group.

9. The method according to claim 7, wherein said scaling factor depends on the ratio between a first transmission power that would be used for transmission on each radio resource of said number of radio resources of the allocation group, and a second transmission power that would be used for transmission on a single radio resource of said number of radio resources.

10. The method according to claim 9, wherein said first and second transmission powers are calculated according to network parameters and to path loss estimates.

11. The method according to claim 1, wherein the radio resources are distributed over transmission time intervals and wherein the method is executed at each transmission time interval.

12. A wireless communications network comprising a station providing radio coverage over a network cell, said station comprising an allocation unit for determining allocation of radio resources for uplink transmissions, the allocation unit being configured to:
   select, among said radio resources, an allocation group comprising an ordered succession of radio resources available for allocation from a first radio resource to a last radio resource,
   iteratively perform:
   selecting the last radio resource of the allocation group, each last radio resource taking, at each iteration, a position in the ordered succession lower than a position taken in the ordered succession by the last radio resource at an immediately previous iteration,
   estimating a signal to interference-plus-noise ratio per radio resource of the allocation group according to a number of radio resources of the allocation group, from the first to the last radio resources of the allocation group, and according to history transmissions information, until the signal to interference-plus-noise ratio per radio resource is higher than a predetermined signal to interference-plus-noise ratio, the estimation of the signal to interference-plus-noise ratio including multiplying the signal to interference-plus-noise ratio by a scaling factor that is based on a number of radio resources in the allocation group, and
   allocating the radio resources from said first to said last radio resources of the allocation group.

13. The wireless communications network according to claim 12, wherein the wireless communications network is a cellular network based on LTE/LTE-Advanced technology.

* * * * *